United States Patent
Wang

(10) Patent No.: US 8,957,871 B2
(45) Date of Patent: Feb. 17, 2015

(54) APPLICATION PROTECTION SYSTEM AND METHOD ON TOUCH DISPLAY OF HANDHELD DEVICE

(71) Applicants: Inventec (Pudong) Technology Corporation, Shanghai (CN); Inventec Corporation, Taipei (TW)

(72) Inventor: Yimin Wang, Shanghai (CN)

(73) Assignees: Inventec (Pudong) Technology Corporation, Shanghai (CN); Inventec Corporation, Taipei (TW)

( * ) Notice: Subject to any disclaimer, the term of this patent is extended or adjusted under 35 U.S.C. 154(b) by 219 days.

(21) Appl. No.: 13/803,187

(22) Filed: Mar. 14, 2013

(65) Prior Publication Data

US 2014/0078079 A1  Mar. 20, 2014

(30) Foreign Application Priority Data

Sep. 18, 2012  (CN) .......................... 2012 1 0348029

(51) Int. Cl.
*G06F 3/041* (2006.01)
*G06F 21/62* (2013.01)
*H04L 29/06* (2006.01)
*H04M 1/67* (2006.01)
*G06F 21/36* (2013.01)

(52) U.S. Cl.
CPC .............. *G06F 3/041* (2013.01); *G06F 21/629* (2013.01); *H04L 63/083* (2013.01); *H04M 1/67* (2013.01); *H04M 2250/22* (2013.01); *G06F 21/36* (2013.01)
USPC .............................. 345/173; 345/531; 345/501

(58) Field of Classification Search
None
See application file for complete search history.

(56) References Cited

U.S. PATENT DOCUMENTS 8,638,385 B2 * 1/2014 Bhogal .................... 348/333.02
2010/0306693 A1 * 12/2010 Brinda .......................... 345/173

* cited by examiner

*Primary Examiner* — Muhammad N Edun
(74) *Attorney, Agent, or Firm* — Bacon & Thomas, PLLC

(57) ABSTRACT

A application protection system and method on a touch display of a handheld device are provided. A application is protected by executing a application protection program; and when a user needs to use the application, the protection on the application is removed by performing an accurate protection operation, thereby achieving a technical efficacy of protecting the application in the handheld device so as to protect personal data.

10 Claims, 9 Drawing Sheets

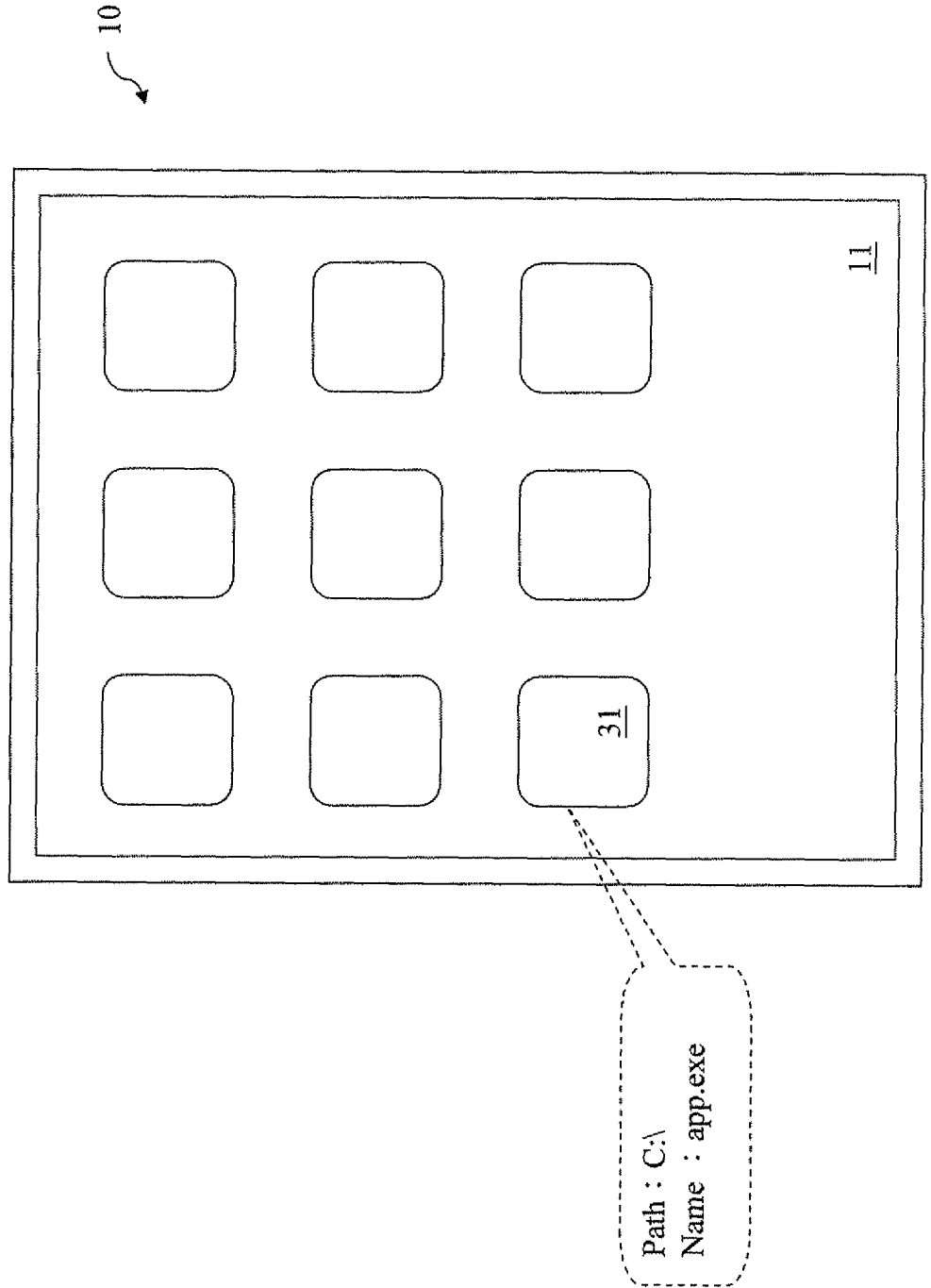

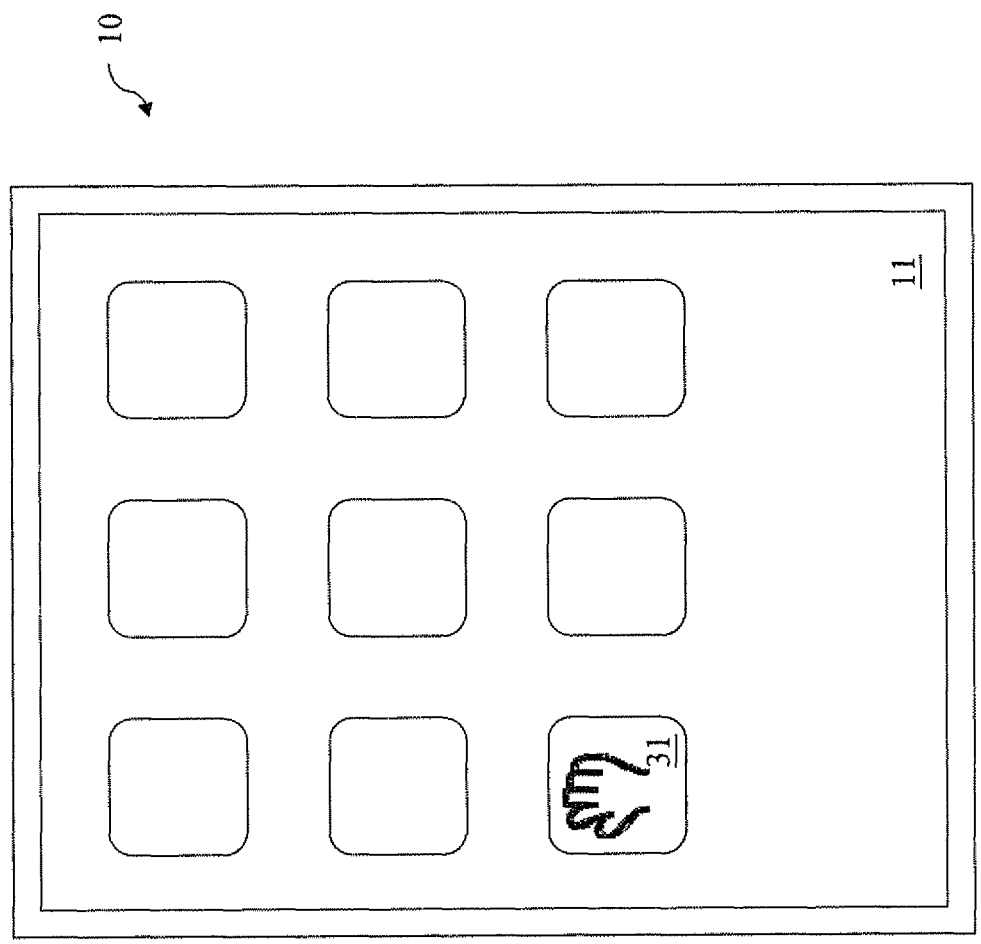

APPLICATION PROTECTION SYSTEM AND METHOD ON TOUCH DISPLAY OF HANDHELD DEVICE

BACKGROUND OF THE INVENTION

1. Field of the Invention

The present invention relates to an application protection system and method, and more particularly to an application protection system and method on a touch display of a handheld device, 2. Description of Related Art The development and application of handheld devices are extremely rapid. The development trends from mobile phones and Personal Digital Assistants (PDAs) in early times to tablets and smart phones, enabling that convenience brought by the handheld devices to people has been indispensable in people's daily life.

The handheld devices in early times are controlled and operated in a key manner; however, a large space is occupied in the key manner, indirectly limiting a display screen of the handheld device.

Up to this day, due to the development of touch panel technologies, the existing handheld devices (for example, tablets and smart phones) get rid of the old manner in which the handheld devices are controlled and operated by depending on keys, and use a touch manner to control and operate the handheld devices, so that a wider screen can be applied on the handheld device and the user can use and operate the handheld device more conveniently.

In the case that the handheld devices are controlled and operated in the key manner in early times or in the current touch manner, for privacy of the user, personal data of the user is generally protected through a screen lock function, that is, the screen of the whole handheld device is locked, so as to achieve a protection effect.

However, when it is required to lend the handheld device to another person for use, it is ineffective to protect the personal data of the user through the screen lock function, resulting in a risk that the personal data of the user is stolen and usurped.

To sum up, it can be known that, in the prior art, the problem that there is a risk when the handheld device performs protection on the personal data of the user through a screen lock function exists for a long time, so it is actually necessary to propose improved technical means to solve this problem.

SUMMARY OF THE INVENTION

In view of the problem in the prior art that there is a risk when the handheld device performs protection on the personal data of the user through a screen lock function, the present invention discloses an application protection system and method on a touch display of a handheld device, In the application protection system on a touch display of a handheld device disclosed by the present invention, plurality of applications are displayed on the touch display, the system includes: a selection module, a receiving module, and a storage module.

The selection module is used for selecting a path and a name of an application, the application is one of plurality of applications are displayed on the touch display; the receiving module is used for receiving a protection operation and adding the protection operation to the application on the application protection system; and the storage module is used for storing the path, the name, and the protection operation of the application, so that the application is in a lock state and the other of plurality of applications are in an unlock state.

In the application protection method on a touch display of a handheld device disclosed by the present invention, plurality of applications are displayed on the touch display, the method includes the following steps:

An application protection program is executed; the application protection program selects a path and a name of an application, the application is one of plurality of applications are displayed on the touch display device; the application protection program receives a protection operation and adding the protection operation to the application on the application protection program; and the application protection program stores the path, the name, and the protection operation, so that the application is in a lock state and the other of plurality of applications are in an unlock state.

The system and the method disclosed by the present invention are described above, and the difference between the present invention and the prior art lies in that, in the present invention, the application protection program correspondingly records the protection operation, and the path and the name of the application in the application, so that the application can be protected through the application protection program, and only when a comparison operation passes comparison authentication of the application protection program, the application can be executed, so as to unlock the protection on the application, thereby avoiding a risk when the handheld device performs protection on the personal data of the user through a screen lock function.

Through the foregoing technical means, the present invention can achieve a technical efficacy of protecting the application of the handheld device so as to protect the personal data.

BRIEF DESCRIPTION OF THE DRAWINGS

The invention will become more fully understood from the detailed description given herein below illustration only, and thus is not limitative of the present invention, and wherein:

FIG. 3 is an architectural diagram of an application protection system on a touch display of a handheld device according to the present invention.

FIG. 6 is an architectural diagram of an application protection system on a touch display of a handheld device according to the present invention.

DESCRIPTION OF THE EMBODIMENTS

Implementation manners of the present invention are illustrated in detail below with reference to accompanying drawings and embodiments, so the implementation procedure about how technical means is applied to the present invention to solve the technical problem and achieve the technical efficacy can be fully understood and implemented accordingly.

Figure 1:
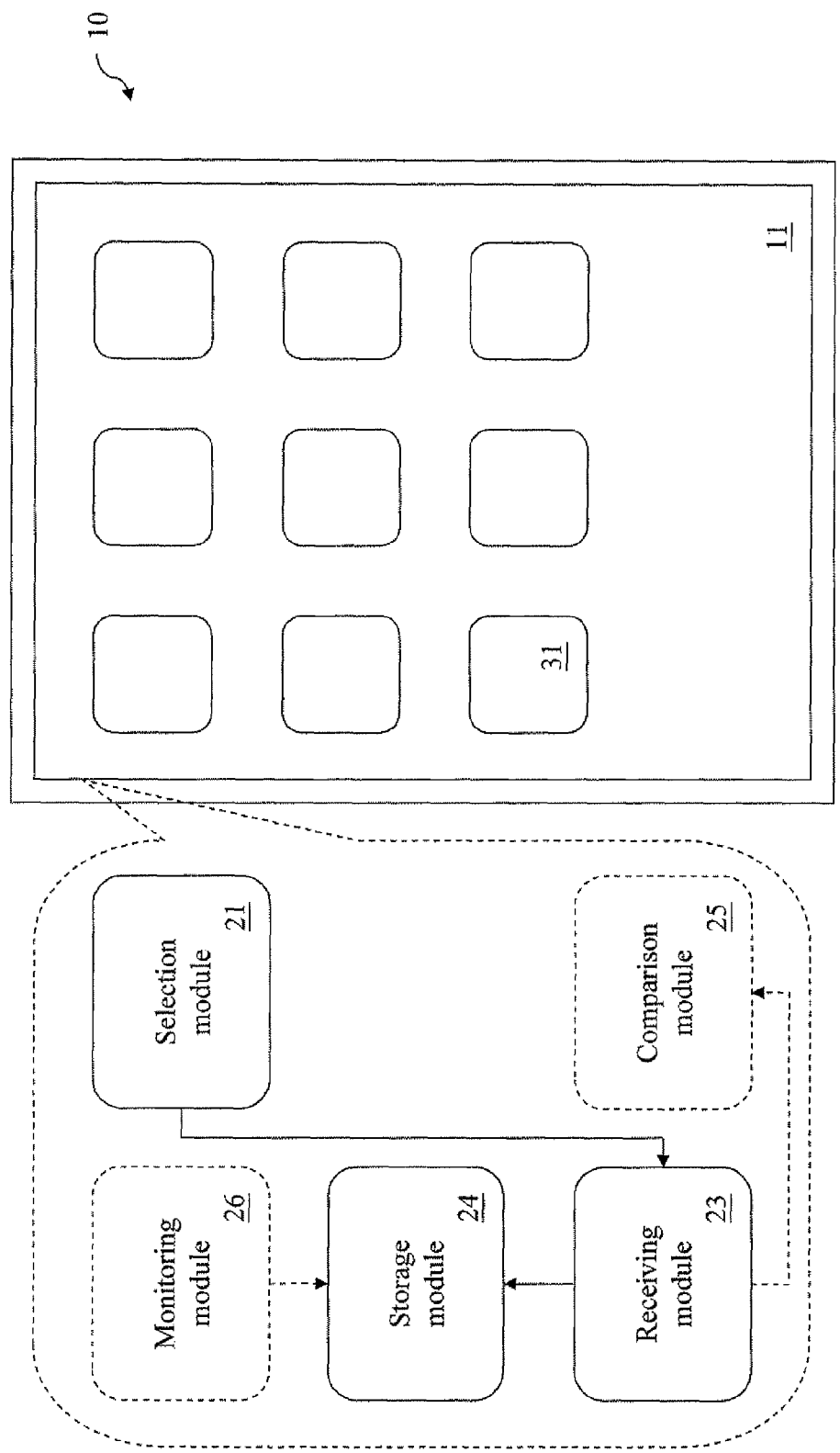
FIG. 1 is a block diagram of an application protection system on a touch display of a handheld device according to the present invention.

First, an application protection system on a touch display of a handheld device disclosed by the present invention is described below, and referring to FIG. 1, a block diagram of an application protection system on a touch display of a handheld device provided in the present invention is shown.

In the application protection system for an application disclosed by the present invention, plurality of applications are displayed on a touch display 11, the application protection system on a touch display 11 of the handheld device is implemented in the handheld device 10, specifically, may be implemented in a background environment of the handheld device 10 and may also be implemented in a general environment of the handheld device 10, which is merely an example for description herein and is not intended to limit the application scope of the present invention.

The application protection system on a touch display of a handheld device includes: a selection module 21, a receiving module 23, and a storage module 24.

When a user needs to protect an application 31, by clicking (for example, pressing the application 31 over a set duration, which is merely an example for description herein and is not intended to limit the application scope of the present invention) the application 31 with the touch display device 11, the selection module 21 receives a path and a name of the application 31.

After the selection module 21 receives the path and the name of the application 31, a user interface is provided, so that the user can input a protection operation through the user interface. The receiving module 23 receives the protection operation through the user interface with the touch display device, where the protection operation may be one of a password, gesture operation, voice input, and facial recognition, which is merely an example for description herein and is not intended to limit the application scope of the present invention.

After the receiving module 23 receives the protection operation, the storage module 24 stores the path and the name of the application 31, and the protection operation, so as to protect the application 31.

When the application 31 is executed, a user unlocking interface is provided, so that the user can input a comparison operation through the user unlocking interface. The receiving module 23 receives the comparison operation corresponding to the name of the application 31 through the user interface with the touch display device 11, where the comparison operation may be one of a password, gesture operation, voice input, and facial recognition, which is merely an example for description herein and is not intended to limit the application scope of the present invention.

Specifically, when the comparison operation received by the receiving module 23 through the user unlocking interface is a "password", a comparison module 25 compares the comparison operation being the "password" with the protection operation being the "password" corresponding to the name of the application 31. When the comparison operation being the "password" passes the comparison authentication performed by the comparison module 25, it is allowed to execute the application 31, so as to unlock the application 31 for the user to use.

In addition, when the comparison operation received by the receiving module 23 through the user unlocking interface is a "gesture operation", the comparison module 25 compares the comparison operation being the "gesture operation" with the protection operation being the "gesture operation" corresponding to the name of the application 31. When the comparison operation being the "gesture operation" passes the comparison authentication performed by the comparison module 25, it is allowed to execute the application 31, so as to unlock the application 31 for the user to use.

After the application 31 is executed for a preset duration (such as, 3 minutes and 90 seconds, which is merely an example for description herein and is not intended to limit the application scope of the present invention), the application protection system on a touch display of the handheld device may protect the application 31 again. The preset duration may be set freely by the user, which is merely an example for description herein and is not intended to limit the application scope of the present invention.

The system monitors the application 31 through the monitoring module 26, so that when the path, the name or the protection operation of the application 31 is changed, the system updates the path, the name and the protection operation that are correspondingly stored.

Figure 2:
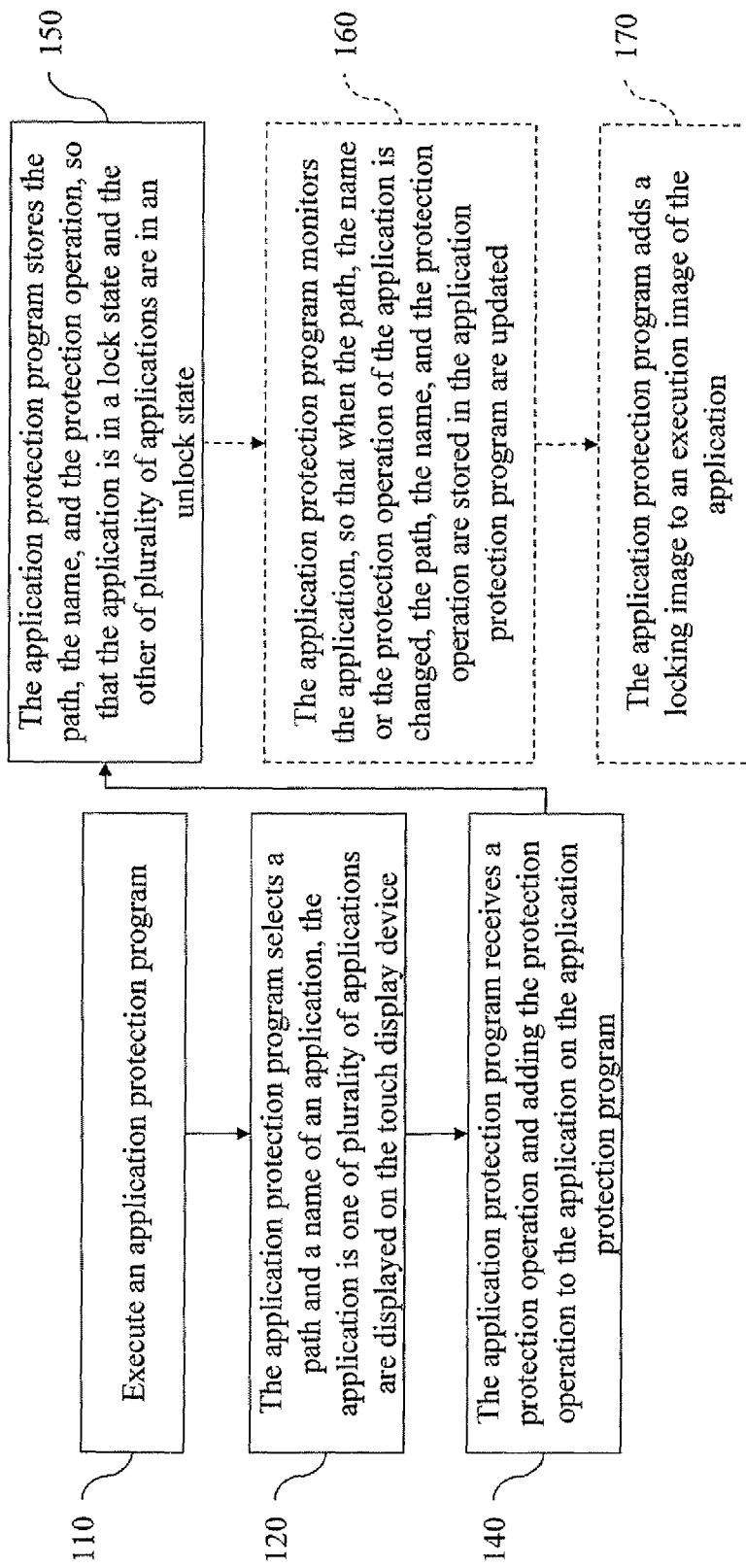
FIG. 2 is a flow chart of an application protection method on a touch display of a handheld device according to the present invention.

Afterwards, an embodiment below is used to illustrate an operation mode and flow of protecting an application in a handheld device, and the following embodiment is described with reference to FIG. 2. FIG. 2 is a flow chart of an application protection method on a touch display of a handheld device provided in the present invention.

Referring to FIG. 3, an architectural diagram of an application protection system on a touch display of a handheld device according to the present invention is shown.

Plurality of applications are displayed on a touch display 11. An application protection program is executed in the handheld device 10 (Step 110), and in the handheld device 10, the application protection program is executed in a background or in a general environment, which is merely an example for description herein and is not intended to limit the application scope of the present invention.

When a user needs to protect an application 31, by clicking (for example, pressing the application 31 over a set duration, which is merely an example for description herein and is not intended to limit the application scope of the present invention) the application 31 with the touch display device 11, the application protection program receives a path "C:\" and a name "app.exe" of the application 31 (Step 120).

Figure 4A:
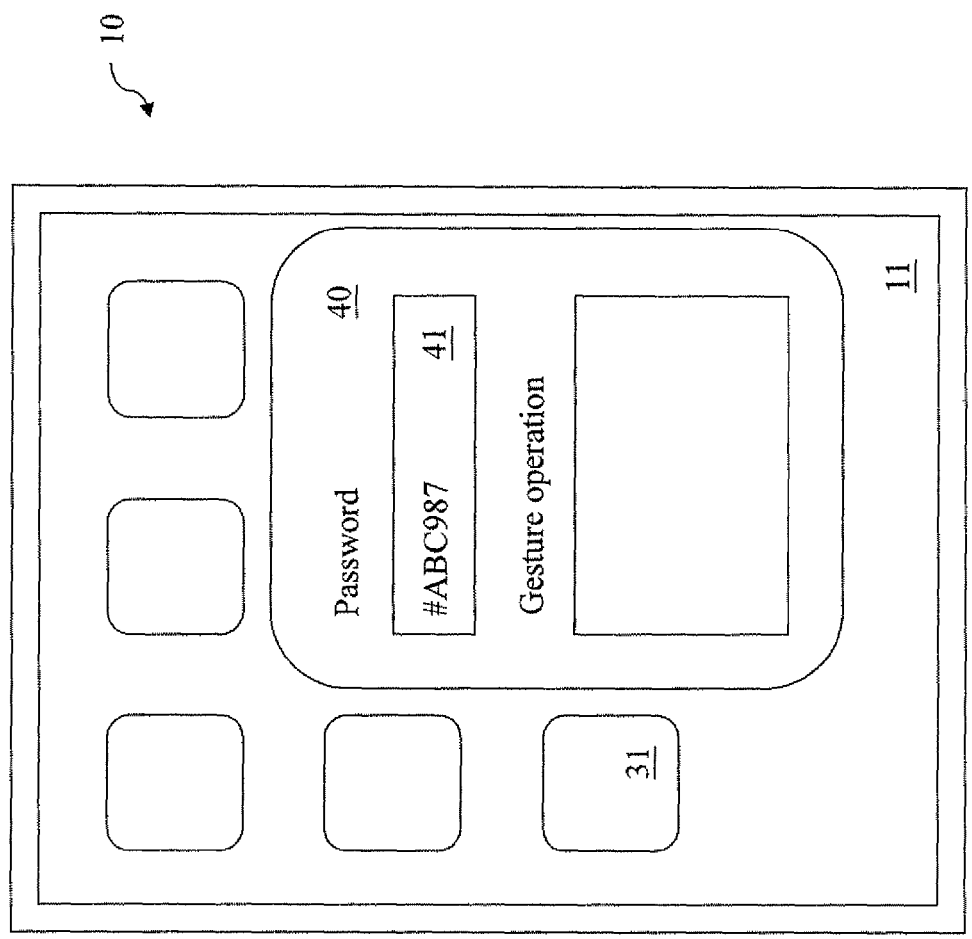
FIG. 4A is a schematic diagram showing a first implementation of a user interface through which an application in a handheld device is protected according to the present invention.

Referring to FIG. 3 and FIG. 4A together, FIG. 4A is a schematic diagram showing a first implementation of a user interface through which an application in a handheld device is protected according to the present invention.

The application protection program provides a user interface 40. The user may input a password "#ABC987" (that is, a protection operation) in a first input area 41 of the user interface 40, and a receiving module 23 receives the password (Step 140). The password is a combination of letters, digits and symbols, and in addition to "#ABC987", the password may also be "XYZ123", "ASDFGH", or the like, which is merely an example for description herein and is not intended to limit the application scope of the present invention.

The application protection program stores the path "C:\" and the name "app.exe" of the application 31, and the password "#ABC987", so as to protect the application 31 (Step 150). That is to say, before being started (a mode of starting the application 31 may be directly executing the application 31, executing the application 31 through a short-cut, executing the application 31 through a command prompt, or the like, which is merely an example for description herein and is not intended to limit the application scope of the present invention), the application 31 can be allowed to be started and executed merely after password authentication through the application protection program succeeds.

Figure 4B:
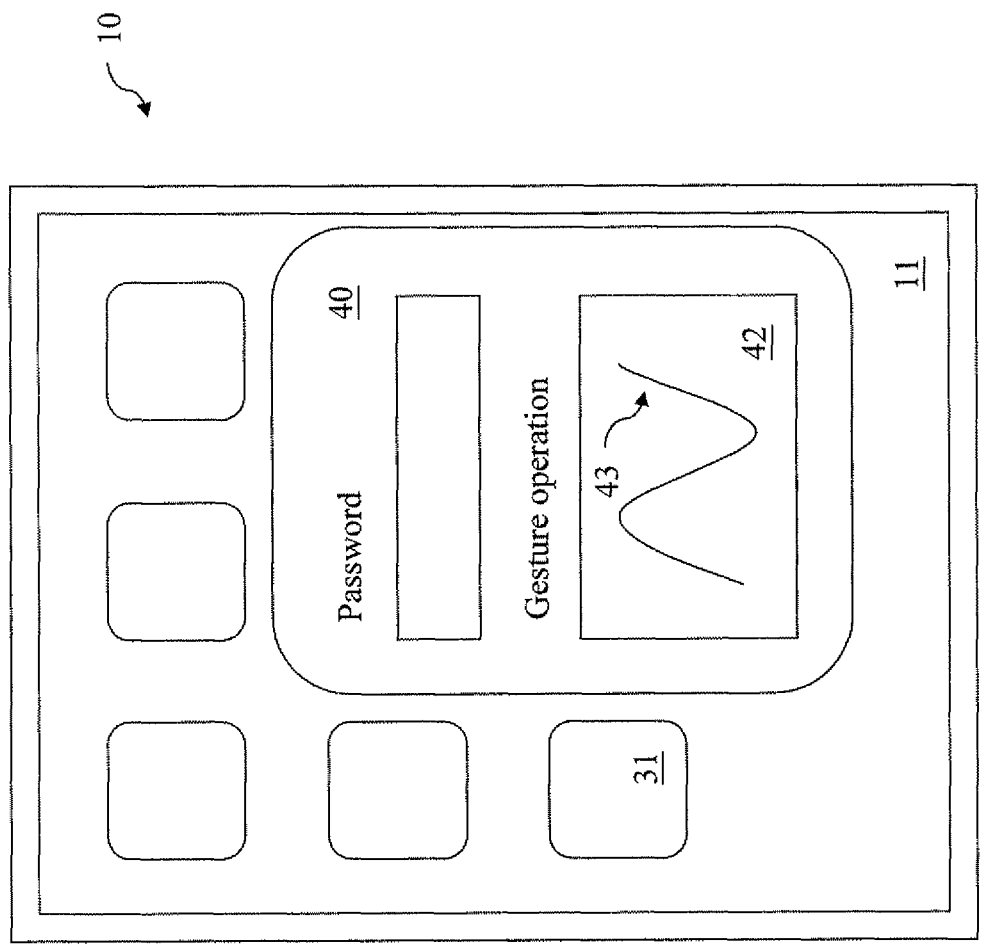
FIG. 4B is a schematic diagram showing a second implementation of a user interface through which an application in a handheld device is protected according to the present invention.

Referring to FIG. 3 and FIG. 4B together, FIG. 4B is a schematic diagram showing a second implementation of a user interface in the application protection system on a touch display of a handheld device provided in the present invention.

The application protection program provides a user interface 40, and the user can input a protection operation in a second input area 42 of the user interface 40 (Step 140). As shown in FIG. 4B, an input operation of the user in the second input area 42 is a touch track 43 drawn with the touch display device 11, where the touch track 43 in FIG. 4B is merely an example for description, and is not intended to limit the application scope of the present invention.

The application protection program stores the path "C:\" and the name "app.exe" of the application 31, and the gesture operation (that is, the touch track 43 is a protection operation), so as to protect the application 31 (Step 150). That is to say, before being started, the application 31 can be allowed to be started and executed merely after authentication of the gesture operation (that is, the touch track 43) through the application protection program succeeds.

The application protection program may further monitor the application 31. That is to say, when the path of the application 31 is changed to "D:\" and the name thereof is changed to "add.exe", the path "D:\" and the name "add.exe" of the application 31, and the password "#ABC987" corresponding to the name "add.exe" of the application 31 that are correspondingly stored by the application protection program are updated (Step 160). The application protection program adds a locking image to an execution image (or a short-cut image of the application 31) of the application 31 (Step 170), which is merely an example for description herein and is not intended to limit the application scope of the present invention.

Figure 5:
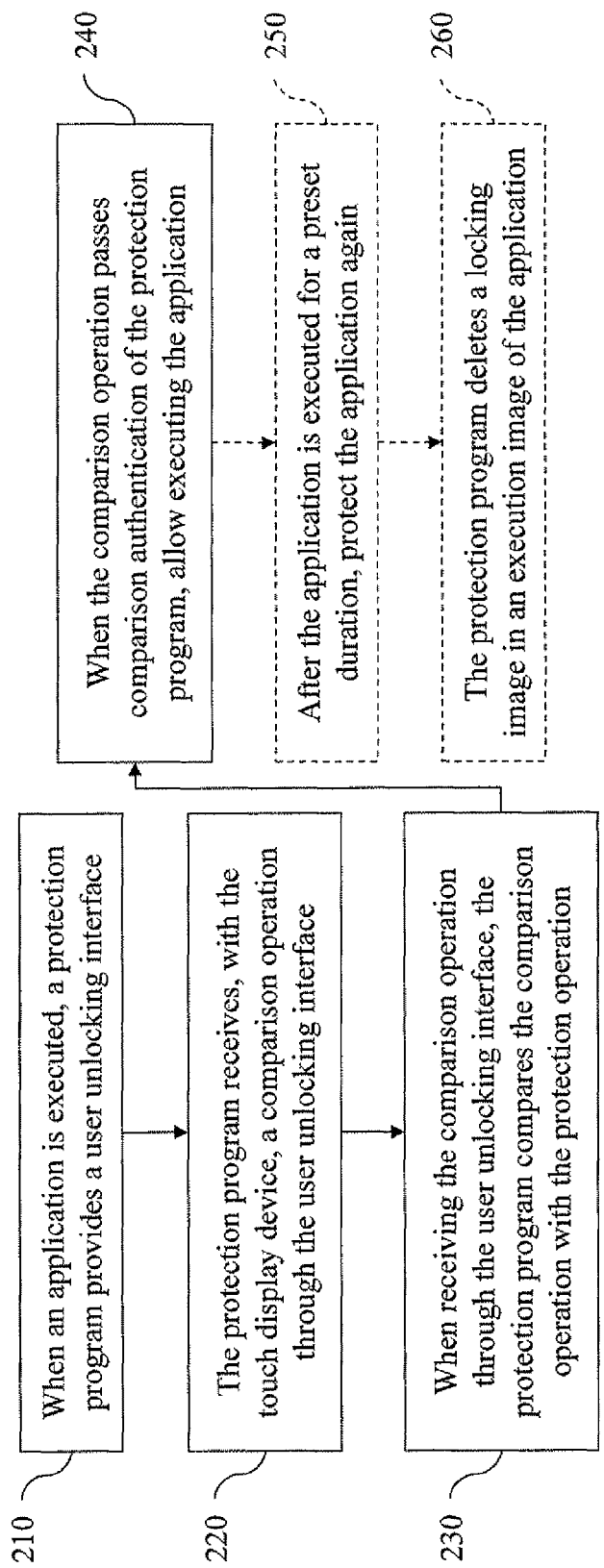
FIG. 5 is a flow chart of a method for unlocking protection on an application in a handheld device according to the present invention.

Afterwards, an embodiment below is used to illustrate an operation mode and flow of unlocking protection on an application in a handheld device, and the following embodiment is described with reference to FIG. 5. FIG. 5 is a flow chart of a method for unlocking protection on an application in a handheld device according to the present invention.

Referring to FIG. 6, an architectural diagram of an application protection system on a touch display of a handheld device according to the present invention is shown.

An application 31 in a handheld device 10 is already protected through an application protection program, while when a user needs to execute the application 31, the application protection program provides a user unlocking interface 50 (Step 210), so that the user can input a comparison operation in a first input area 51 or a second input area 52 of the user unlocking interface 50.

Figure 7A:
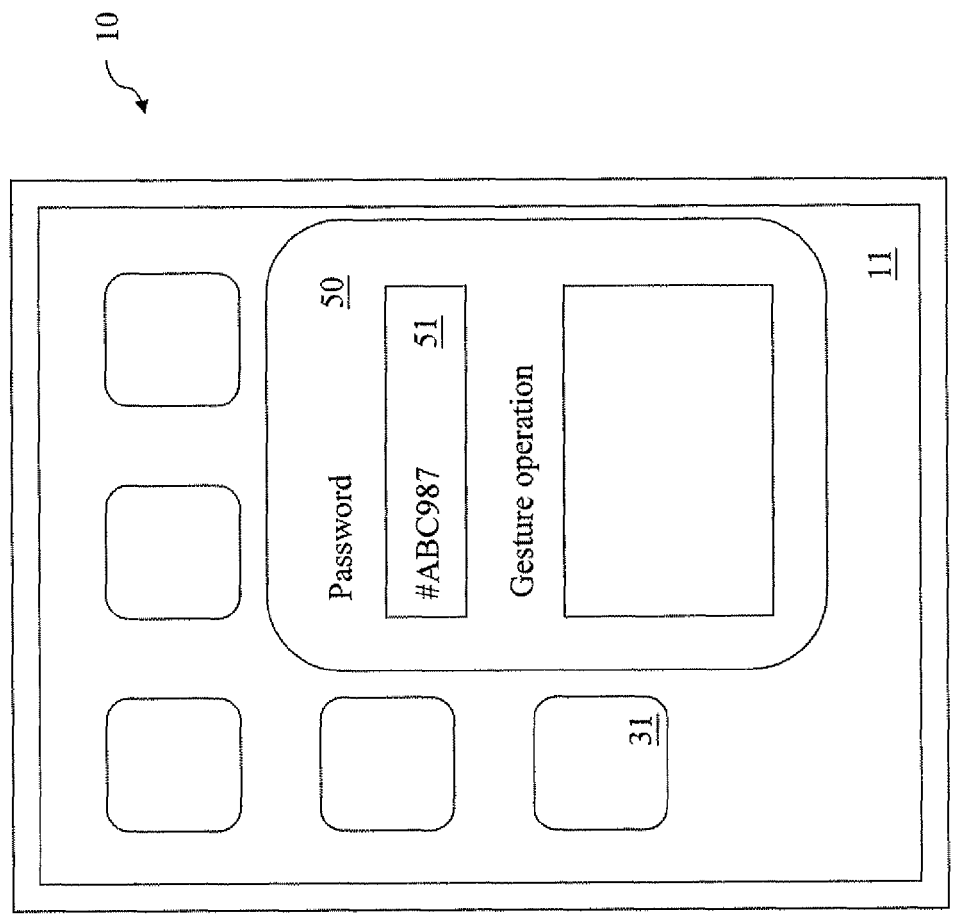
FIG. 7A is a schematic diagram showing a first implementation of a user interface through which protection on an application in a handheld device is unlocked according to the present invention.

Referring to FIG. 6 and FIG. 7A together, FIG. 7A is a schematic diagram showing a first implementation of a user interface through which protection on an application in a handheld device is unlocked according to the present invention.

The user inputs a password "#ABC987" in the first input area 51 of the user interface 50, and a receiving module 23 receives the password (Step 220). The password is a combination of letters, digits and symbols, and in addition to "#ABC987", the password may also be "XYZ123", "ASDFGH", or the like, which is merely an example for description herein and is not intended to limit the application scope of the present invention.

The application protection program receives the password "#ABC987", and compares the password "#ABC987" with a password "#ABC987" corresponding to the application 31 (Step 230). The password "#ABC987" input by the user can pass the comparison authentication of the application protection program, that is, the application 31 may be allowed to be executed, so as to unlock the protection on the application 31 (Step 240).

Figure 7B:
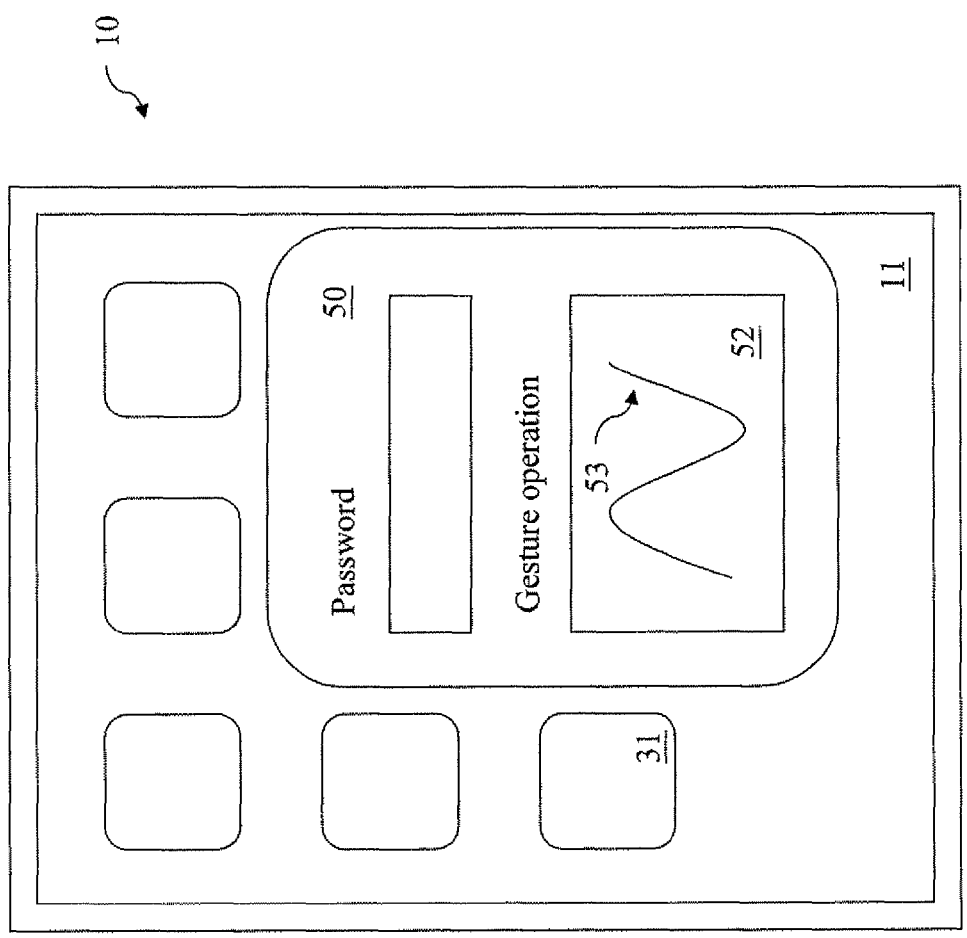
FIG. 7B is a schematic diagram showing a second implementation of a user interface through which protection on an application in a handheld device is unlocked according to the present invention.

Referring to FIG. 6 and FIG. 7B together, FIG. 7B is a schematic diagram showing a second implementation of a user interface through which protection on an application in a handheld device is unlocked according to the present invention.

The user inputs a gesture operation in the second input area 52 of the user unlocking interface 50. As shown in FIG. 7B, an input operation of the user in the second input area 52 is a touch track 53 drawn with the touch display device 11 (Step 220), where the touch track 53 in FIG. 7B is merely an example for description, and is not intended to limit the application scope of the present invention.

The application protection program receives the gesture operation (that is, the touch track 53 is a comparison operation), and compares the gesture operation (that is, the touch track 53) with the gesture operation (that is, the touch track 43, see FIG. 4B) corresponding to the application 31 (Step 230). The gesture operation (that is, the touch track 53) input by the user can pass the comparison authentication of the application protection program, that is, the application 31 may be allowed to be executed, so as to unlock the protection on the application 31 (Step 240).

After the application 31 is executed for a preset duration (such as, 3 minutes and 90 seconds, which is merely an example for description herein and is not intended to limit the application scope of the present invention), the application protection program may protect the application 31 again (Step 250). The preset duration may be set freely by the user, which is merely an example for description herein and is not intended to limit the application scope of the present invention.

After the application 31 passes the comparison authentication of the application protection program, a locking image in an execution image (or a short-cut image of the application 31) of the application 31 is deleted (Step 260), which is merely an example for description herein and is not intended to limit the application scope of the present invention.

To sum up, the difference between the present invention and the prior art lies in that, in the present invention, the application protection program correspondingly records the protection operation, and the path and the name of the application in the application, so that the application is protected through the application protection program, and only when the comparison operation passes the comparison authentication of the application protection program, the application can be executed, so as to unlock the protection on the application, thereby avoiding a risk when the handheld device performs protection on the personal data of the user through a screen lock function.

Through the technical means, the problem in the prior art that a risk exists when the handheld device performs protection on the personal data of the user through a screen lock function, thereby achieving a technical efficacy of providing protection on the application of the handheld device so as to protect the personal data.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An application protection system on a touch display device of a handheld device, plurality of applications are displayed on the touch display, the system comprising:
   a selection module, selecting a path and a name of an application, the application is one of plurality of applications are displayed on the touch display;
   a receiving module, receiving a protection operation and adding the protection operation to the application on the application protection system; and
   a storage module, storing the path, the name, and the protection operation of the application, so that the application is in a lock state and the other of plurality of applications are in an unlock state.

2. The application protection system on a touch display of a handheld device as in claim 1, further comprising a comparison module, when the receiving module receives a comparison operation to the application on the application protection system, comparing the comparison operation with the protection operation, and when the comparison operation passes comparison authentication performed by the comparison module, allowing executing the application.

3. The application protection system on a touch display of a handheld device as in claim 2, wherein the protection operation and the comparison operation comprise a password, gesture operation, voice input, and facial recognition.

4. The application protection system on a touch display of a handheld device as in claim 1, further comprising a monitoring module, monitoring the application, wherein the path, the name or the protection operation of the application is changed, the stored the path, the name, and the protection operation are updated.

5. The application protection system on a touch display of a handheld device as in claim 1, wherein the application protection system on a touch display of a handheld device is implemented in a background environment or a general environment of the handheld device.

6. An application protection method on a touch display of a handheld device, plurality of applications are displayed on the touch display, the method comprising:
   executing a application protection program;
   selecting a path and a name of an application, the application is one of plurality of applications are displayed on the touch display device;
   receiving a protection operation and adding the protection operation to the application on the application protection program; and
   storing the path, the name, and the protection operation, so that the application is in a lock state and the other of plurality of applications are in an unlock state.

7. The application protection method on a touch display of a handheld device as in claim 6, further comprising receiving a comparison operation to the application on the application protection program on the touch display device, when the comparison operation passes comparison authentication of the application protection program, allowing executing the application.

8. The application protection method on a touch display of a handheld device as in claim 7, wherein the protection operation and the comparison operation comprise a password, gesture operation, voice input, and facial recognition.

9. The application protection method on a touch display of a handheld device as in claim 7, wherein in the step of executing the application protection program in the handheld device, the application protection program is executed in a background of the handheld device or in a general environment of the handheld device.

10. The application protection method on a touch display of a handheld device as in claim 6, further comprising: monitoring the application, so that when the path, the name or the protection operation of the application is changed, the path, the name, and the protection operation are stored in the application protection program are updated.

* * * * *